United States Patent
Butler et al.

(10) Patent No.: US 6,529,345 B1
(45) Date of Patent: Mar. 4, 2003

(54) DISK DRIVE EMPLOYING A MULTI-LAYER NOISE-DAMPENING HDA COVER

(75) Inventors: Walter W. Butler, Scotts Valley, CA (US); May C. Kung, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/652,859

(22) Filed: Aug. 31, 2000

(51) Int. Cl.$^7$ ................................................ G11B 17/02
(52) U.S. Cl. .................................. 360/97.01; 360/97.02
(58) Field of Search ........................... 360/97.01, 97.02, 360/97.03, 98.07, 99.04, 99.08

(56) References Cited

U.S. PATENT DOCUMENTS

| | | |
|---|---|---|
| 5,282,100 A | 1/1994 | Tacklind et al. |
| 5,781,373 A | 7/1998 | Larson et al. |
| 5,877,915 A | 3/1999 | Ishida |
| 6,088,190 A | 7/2000 | Anderson |
| 6,177,173 B1 * | 1/2001 | Nelson ..................... 360/97.02 |
| 6,229,668 B1 * | 5/2001 | Huynh et al. ............ 360/97.01 |
| 6,256,165 B1 * | 7/2001 | Kim ......................... 360/97.01 |

* cited by examiner

Primary Examiner—Robert S. Tupper
(74) Attorney, Agent, or Firm—Milad G. Shara, Esq.; Howard H. Sheerin, Esq.

(57) ABSTRACT

A disk drive with reduced acoustic noise is disclosed. The disk drive comprises a disk, a head, an actuator arm for actuating the head radially over the disk, a base, and a cover attached to the base to form a head disk assembly chamber. The cover comprises an inner layer having a depression, the depression comprising a convex surface and a concave surface, an outer layer attached opposite the concave surface to the inner layer, the inner layer and the outer layer thereby defining walls of a cavity. The cover further comprises a damping medium disposed within the cavity, whereby the inner layer, the outer layer, and the damping medium form a multi-layer noise-damping sandwich which reduces noise emitted by the disk drive.

9 Claims, 4 Drawing Sheets

DISK DRIVE EMPLOYING A MULTI-LAYER NOISE-DAMPENING HDA COVER

BACKGROUND OF THE INVENTION

1. Field of the Invention

The present invention relates to disk drives for computer systems. More particularly, the present invention relates to a disk drive employing a multi-layer noise-damping HDA cover.

2. Description of the Prior Art

A computer system usually includes one or more disk drives for economical, non-volatile data storage. FIG. 1 shows a prior art disk drive 100 disclosed in U.S. Pat. No. 5,282,100 to Tacklind et al. which includes a housing formed by fitting a cover comprising an inner layer 102 and a outer layer 104 to a base 106 to create a sealed head disk assembly (HDA) chamber. The HDA includes one or more disks 108 stacked in a spaced-apart relationship on a spindle motor hub and rotated by a spindle motor (not shown). The spindle motor includes a stationary element such as a spindle journal fixed to the disk drive housing at the base and cover to define and stabilize a spindle axis about which the disks 108 rotate. The disks 108 rotate in close proximity to a read/write head 114 that is disposed by means of a head gimbal assembly (HGA) attached to one of a plurality of actuator arms 110.

The actuator arms 110 are part of a head stack assembly (HSA) that turns about a pivot bearing assembly. The pivot bearing assembly includes a stationary element such as a pivot journal that is fixed to the disk drive housing at the base and cover to define and stabilize a pivot axis for the HSA. Typically, the pivot bearing assembly and spindle motor journals are rigidly coupled at the top to the cover and at the bottom to the base, thereby fixing and stabilizing the relationship of the two axes to control head positioning error.

The actuator arms 110 move in response to energizing currents sent to a voice coil motor (VCM) 112 which moves the HSA on the pivot axis, swinging the actuator arms 110 to move the associated heads 114 over the associated disk surfaces. When moved in this manner during normal operation, the HSA tends to vibrate. The spindle motor, rapidly spinning the disks, contributes additional vibration. Vibration from the spindle motor and VCM 112 may be transmitted to the disk drive housing through the pivot and spindle journals. The resulting vibration in the housing causes radiation of acoustic noise, especially from the cover which, having a relatively large vibrating surface, may act like a speaker cone and produce undesirably high levels of acoustic noise.

The demand for increasingly higher data transfer rates to and from the magnetic surfaces of the disk 108 calls for increasingly higher disk rotation speed. However, as the disk rotation speed increases, even higher levels of undesirable acoustic noise are generated.

Referring again to the prior art disk drive of FIG. 1, the outer layer 104 of the HDA cover is attached to the inner layer 102 using a mechanical isolation and sound damping material, such as adhesive coated foam rubber, thereby isolating the outer layer 104 mechanically and acoustically from the inner layer 102. In this manner, the outer layer 104 and sound damping adhesive attenuate the acoustic noise that would otherwise emanate from the inner layer 102. However, as disk rotation speeds increase, further attenuation of acoustic noise is desirable, particularly for certain applications such as digital video recorders.

There is, therefore, a need to further attenuate acoustic noise emanating from a disk drive, particularly since increasing disk rotation speeds has amplified acoustic noise in prior art disk drives.

SUMMARY OF THE INVENTION

The present invention may be regarded as a disk drive with reduced acoustic noise comprising a disk, a head, an actuator arm for actuating the head radially over the disk, a base, and a cover attached to the base to form a head disk assembly chamber. The cover comprises an inner layer having a depression, the depression comprising a convex surface and a concave surface, an outer layer attached opposite the concave surface to the inner layer, the inner layer and the outer layer thereby defining walls of a cavity. The cover further comprises a damping medium disposed within the cavity, whereby the inner layer, the outer layer, and the damping medium form a multi-layer noise-damping sandwich which reduces noise emitted by the disk drive.

In one embodiment the damping medium comprises a metal weight. In an alternative embodiment, the damping medium further comprises an adhesive layer for securing the metal weight to at least one of the walls of the cavity. In yet another embodiment, the damping medium comprises compressed acoustic foam. In still another embodiment, the convex surface of the depression is positioned proximate the disk within the head disk assembly chamber for reducing air turbulence and windage drag.

The present invention may also be regarded as a method for manufacturing a disk drive with reduced acoustic noise. A depression is formed in an inner layer of a cover, the depression comprising a convex surface and a concave surface. An outer layer is attached opposite the concave surface to the inner layer, the inner layer and the outer layer thereby defining walls of a cavity. A damping medium is disposed within the cavity, whereby the inner layer, the outer layer, and the damping medium form a multi-layer noise-damping sandwich which reduces noise emitted by the disk drive. The inner layer of the cover is attached to a base to form a head disk assembly chamber.

DESCRIPTION OF THE PREFERRED EMBODIMENTS

Figure 2:
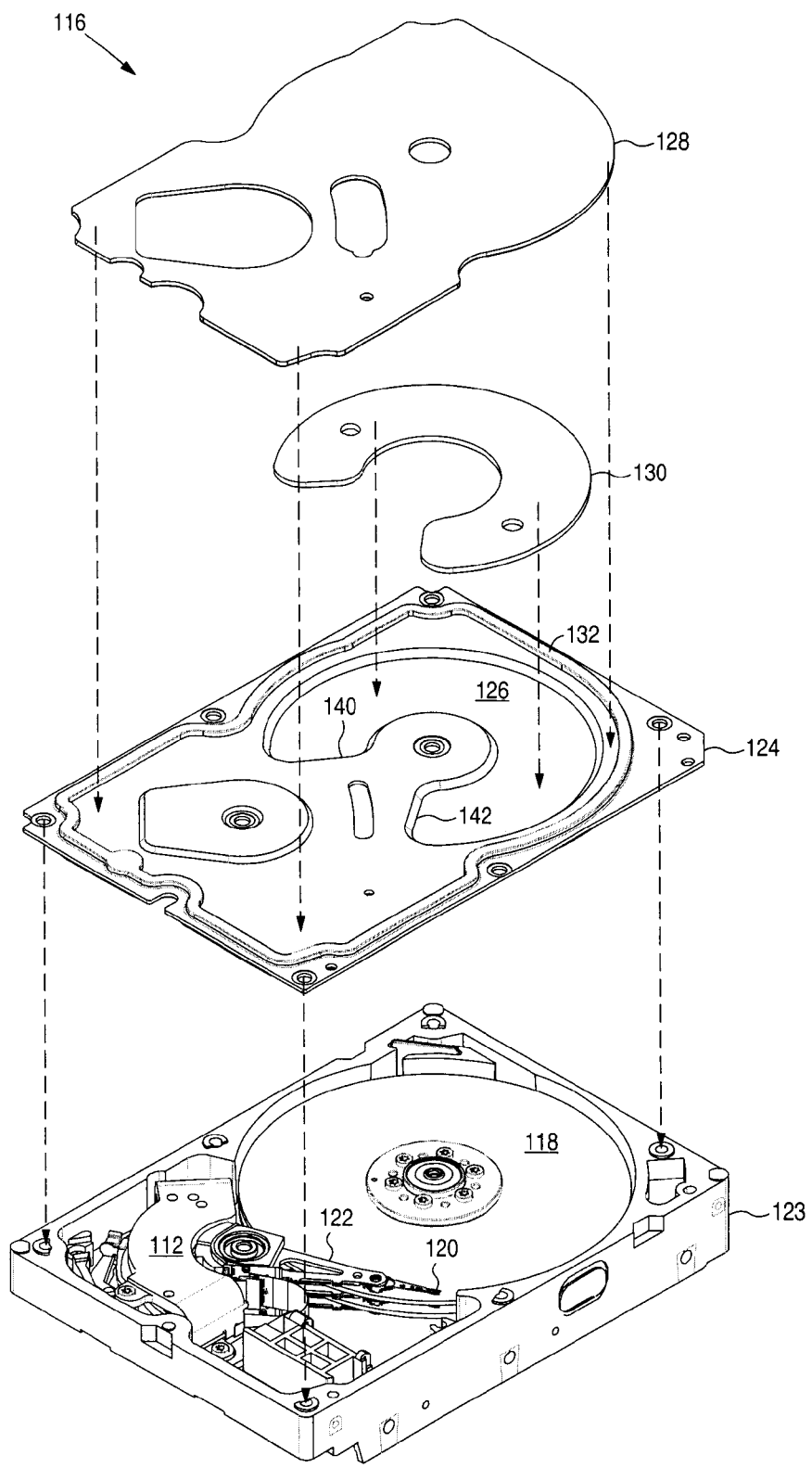
FIG. 2 shows an exploded perspective view of a disk drive according to an embodiment of the present invention as comprising a multi-layer noise-damping cover comprising an inner layer having a depression, an outer layer attached to the inner layer forming a cavity with respect to the depression, and a damping medium disposed within the cavity.

FIG. 2 shows a disk drive 116 with reduced acoustic noise according to an embodiment of the present invention. The disk drive 116 comprises a disk 118, a head 120, an actuator arm 122 for actuating the head 120 radially over the disk 118, a base 123, and a cover attached to the base 123 to form a head disk assembly chamber. The cover comprises an inner layer 124 having a depression 126, the depression 126 defining a convex surface and a concave surface, an outer layer 128 attached opposite the concave surface to the inner layer 124, the inner layer 124 and the outer layer 128 thereby defining walls of a cavity. The cover further comprises a damping medium 130 disposed within the cavity, whereby the inner layer 124, the outer layer 128, and the damping medium 130 form a multi-layer noise-damping sandwich which reduces noise emitted by the disk drive 116.

Figure 1:
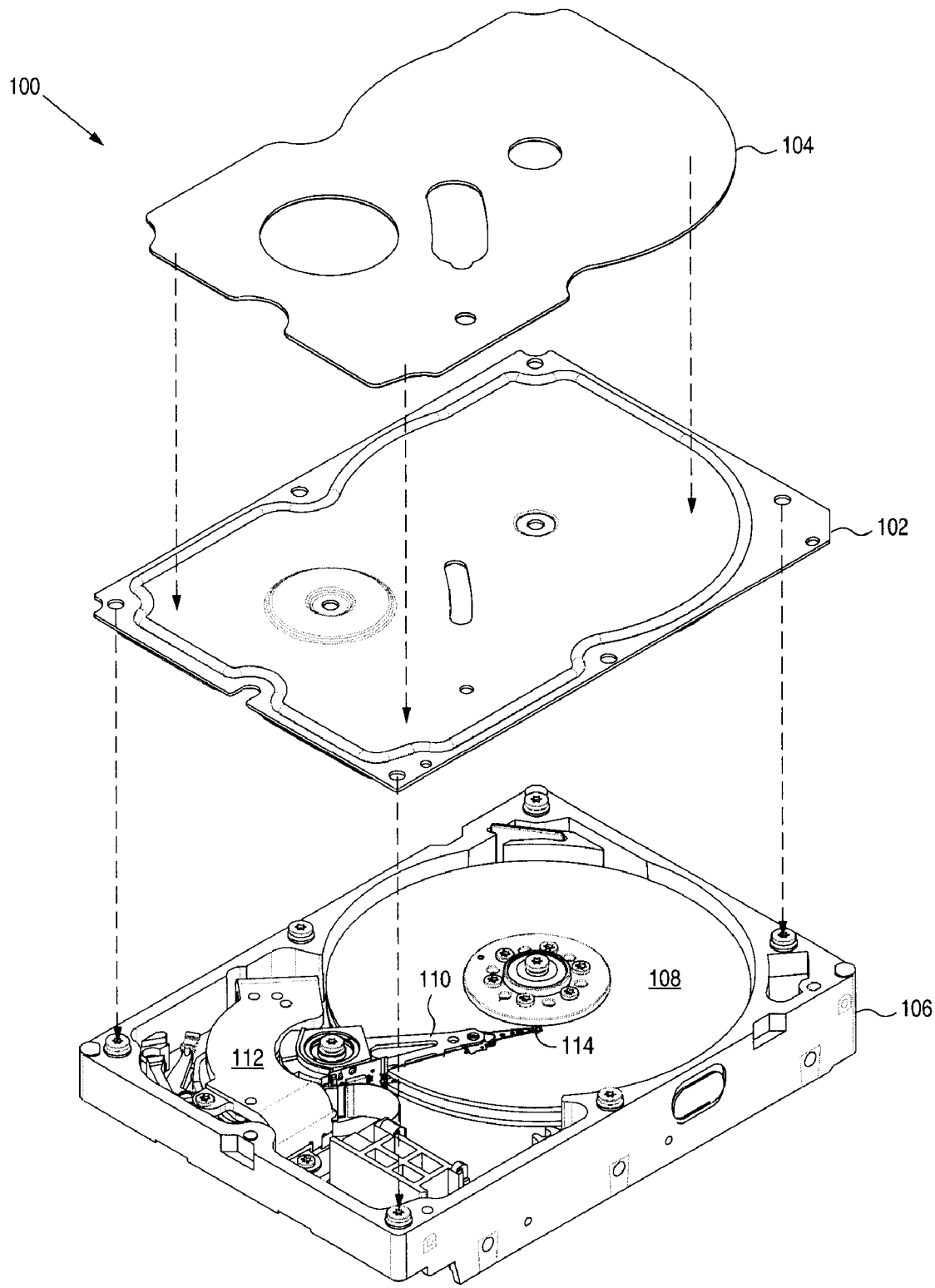
FIG. 1 shows a prior art disk drive comprising a disk, a head, an actuator arm for actuating the head radially over the disk, a base, and a cover attached to the base to form a head disk assembly chamber. The cover comprises an inner layer and an outer layer attached to the inner layer using a damping adhesive.

In one embodiment, the outer layer 128 is adhered to the inner layer 124 using a damping material, such as adhesive coated foam rubber, which provides additional acoustic attenuation similar to the prior art disk drive 100 of FIG. 1. In addition, the inner layer 124 comprises a formed peripheral bead 132 for aligning the periphery of the outer layer 128 to the inner layer 124.

Figure 3A:
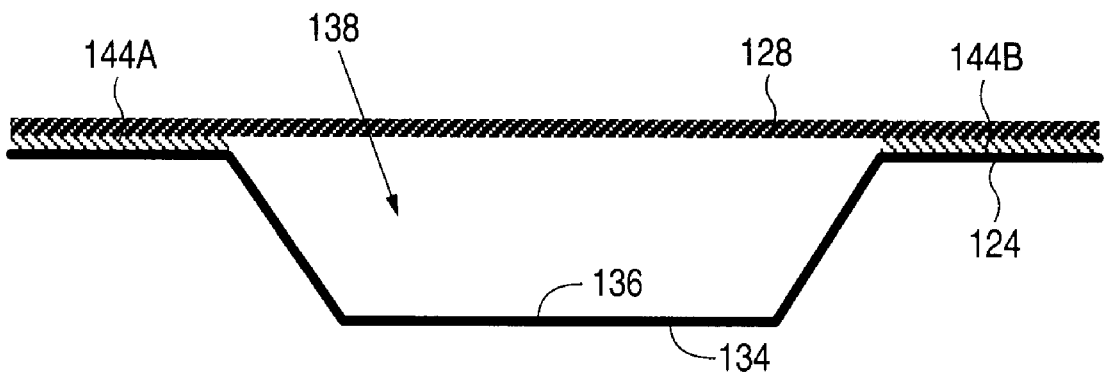
FIG. 3A shows a cross-sectional view of the multi-layer noise-damping cover shown in FIG. 2.

FIG. 3A shows a cross-sectional view of the multi-layer noise-damping cover of FIG. 2, including the convex surface 134 and the concave surface 136 of the depression 126 formed in inner layer 124 of the cover. The outer layer 128 is attached opposite the concave surface 136 to the inner layer 124. The inner layer 124 and the outer layer 128 thereby define walls of the cavity 138 where the damping medium 130 is disposed.

In one embodiment, the convex surface 134 of the depression 126 is positioned adjacent the disk 118 of FIG. 2, thereby reducing the volume of air adjacent the disk 118. This embodiment provides axial shrouding which reduces windage drag on the disk 118 as it rotates, and reduces air turbulence which might otherwise perturb the actuator arm 122.

In one embodiment, the depression 126 is substantially arc-shaped or C-shaped as shown in FIG. 2. Associated with this shape are depression extremities 140 and 142. The depression extremities 140 and 142 are formed in the inner layer 124 in such an orientation that, when the inner layer 124 is attached to the base 123, depression extremity 140 lies on one side of the actuator arm 122, and depression extremity 142 lies on the other side of the actuator arm 122. In this way, the convex surface 134 of the depression 126 can be brought closer to the disk 118, thereby displacing a larger volume of air 118 while providing a gap to allow the actuator arm 122 to rotate and actuate the head 120 radially over the disk 118. Further, maximizing the volume of the cavity 138 maximizes the mass of the damping medium 130, thereby enhancing the acoustic noise attenuation.

The damping medium 130 comprises any suitable material which provides the desired acoustic damping effect. In one embodiment, the damping medium 130 comprises a metal weight, such as stainless steel or aluminum. In alternative embodiment, the damping medium 130 comprises a compressed acoustic foam. In yet another embodiment, the mass of the damping medium 130 is selected to form a tuned mass damper system.

Figure 3B:
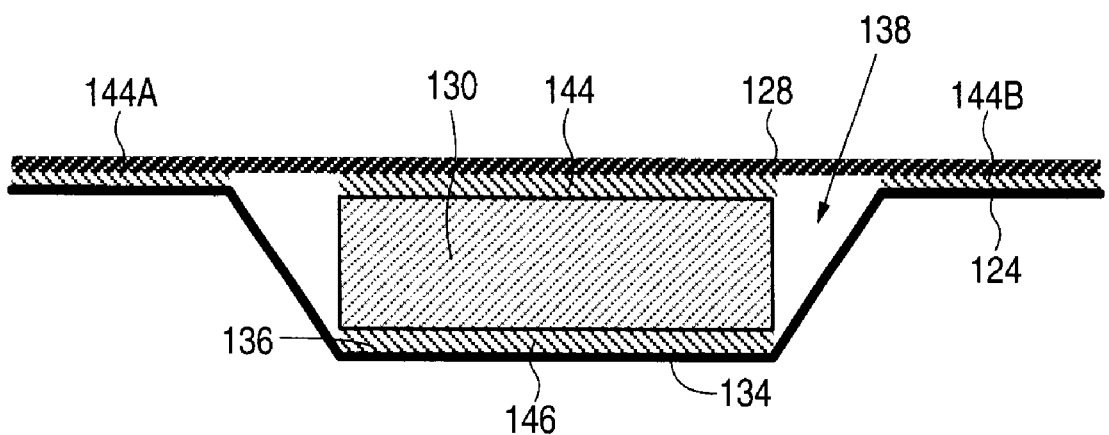
FIG. 3B shows the damping medium disposed within the cavity of the cover, wherein in one embodiment the damping medium is first adhered to the outer layer of the cover and then disposed into the depression of the inner layer by attaching the outer layer to the inner layer. An epoxy adhesive is disposed in the concave surface of the depression to secure the damping medium to the inner layer.

FIG. 3B illustrates a method of manufacturing a disk drive with reduced acoustic noise according to an embodiment of the present invention. A depression is formed in an inner layer 124 of a cover, the depression comprising a convex surface 134 and a concave surface 136. An outer layer 128 is attached opposite the concave surface 136 to the inner layer 124, the inner layer 124 and the outer layer 128 thereby defining walls of a cavity 138. A damping medium 130 is disposed within the cavity 138, whereby the inner layer 124, the outer layer 128, and the damping medium 130 form a multi-layer noise-damping sandwich which reduces noise emitted by the disk drive. The inner layer 124 of the cover is attached to a base 123 to form a head disk assembly chamber as shown in FIG. 2.

In one embodiment, the damping medium 130 is first attached to the outer layer 128 using a suitable adhesive 144 which may be the same adhesive 144A and 144B used to adhere the outer layer 128 to the inner layer 124. A suitable adhesive 146, such as epoxy, is also disposed onto the concave surface 136 of the depression 126. The outer layer 128 is then attached to the inner layer 124 such that the damping medium 130 is pressed onto the adhesive 146, thereby securing the damping medium 130 to the concave surface 136 of the depression 126.

In yet another embodiment of the present invention, the method of manufacturing the disk drive comprises the step of selecting a mass of the damping medium 130 to form a tuned mass damper system. The mass is selected through an iterative process wherein several different mass values are used for the damping medium 130, and the mass value which provides the desired acoustic noise damping effect is selected for manufacturing the disk drive.

Figure 4A:
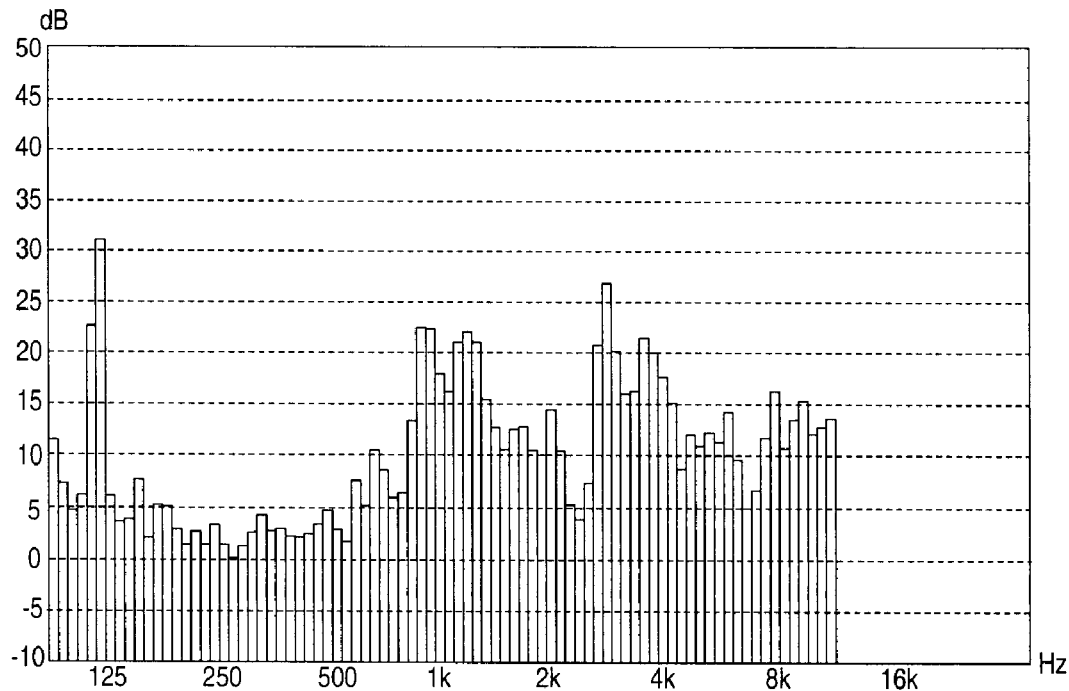
FIG. 4A shows a spectrogram of the noise emitted from a disk drive fitted with the prior art cover shown in FIG. 1.
Figure 4B:
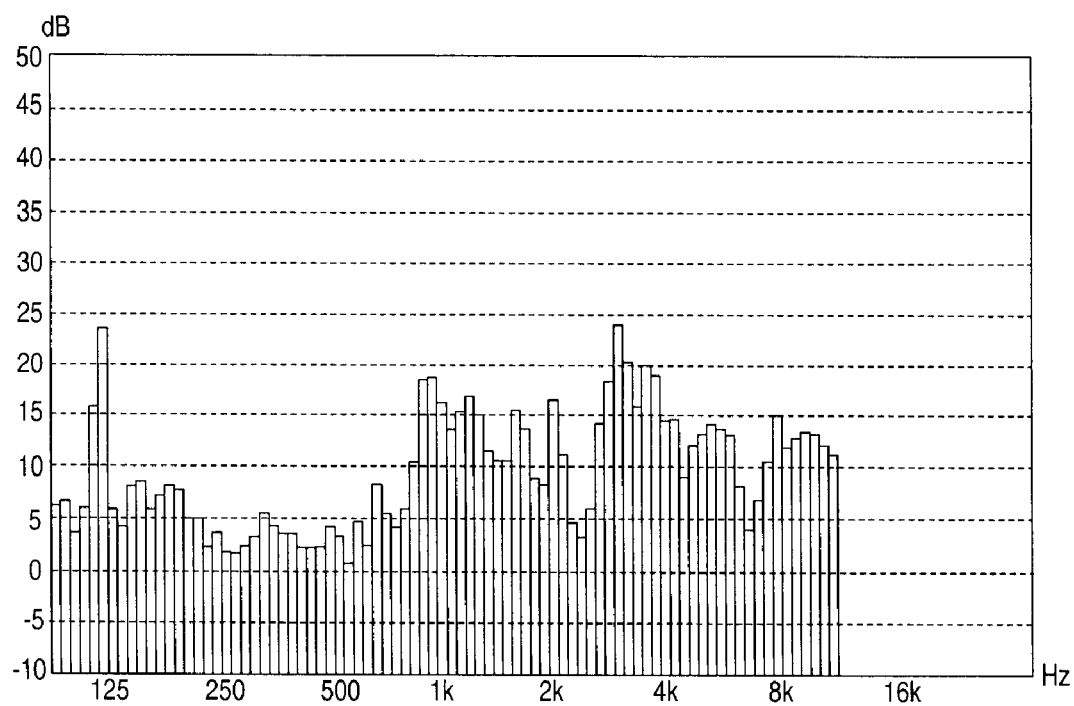
FIG. 4B shows a spectrogram of the noise emitted from a disk drive fitted with the multilayer noise-damping cover shown in FIG. 2.

FIG. 4A shows a spectrogram of the acoustic noise power emitted by a prior art disk drive using the cover comprising only inner layer 102 and outer 104 as shown in FIG. 1. In contrast, FIG. 4B shows a spectrogram of the acoustic noise power emitted by a disk drive employing the multi-layer noise-damping cover shown in FIG. 2 according to an embodiment of the present invention, wherein the noise power has been reduced by several decibels for several frequencies in the spectrum.

We claim:

1. A disk drive with reduced acoustic noise, comprising:
    (a) a disk;
    (b) a head;
    (c) an actuator arm for actuating the head radially over the disk;
    (d) a base; and
    (e) a cover attached to the base to form a head disk assembly chamber, the cover comprising:
        an inner layer having a depression, the depression comprising a convex surface and a concave surface;
        an outer layer attached opposite the concave surface to the inner layer, the inner layer and the outer layer thereby defining walls of a cavity; and
        a damping medium disposed within the cavity, whereby the inner layer, the outer layer, and the damping medium form a multi-layer noise-damping sandwich which reduces noise emitted by the disk drive,
    wherein the damping medium comprises a metal weight.

2. The disk drive as recited in claim 1, wherein the metal weight comprises stainless steel.

3. The disk drive as recited in claim 1, wherein the damping medium further comprises an adhesive layer for securing the metal weight to at least one of the walls of the cavity.

4. The disk drive as recited in claim 3, wherein the adhesive layer comprises epoxy.

5. The disk drive as recited in claim 3, wherein a mass of the metal weight is selected to form a tuned mass damper system.

6. A method for manufacturing a disk drive with reduced acoustic noise, comprising the steps of:
   (a) forming an inner layer of a cover;
   (b) forming a depression in the inner layer of the cover, the depression comprising a convex surface and a concave surface;
   (c) forming an outer layer of the cover;
   (d) attaching a damping medium to the outer layer of the cover;
   (e) disposing an adhesive onto the concave surface of the depression;
   (f) attaching the outer layer to the inner layer such that the damping medium is pressed onto the adhesive, thereby securing the damping medium to the concave surface of the depression, whereby the inner layer and the outer layer define walls of a cavity and the damping medium being disposed within the cavity; and
   (g) attaching the inner layer of the cover to a base to form a head disk assembly chamber.

7. The method for manufacturing a disk drive with reduced acoustic noise as recited in claim 6, wherein the adhesive comprises an epoxy.

8. The method for manufacturing a disk drive with reduced acoustic noise as recited in claim 6, further comprising the step of selecting a mass of the damping medium to form a tuned mass damper system.

9. The method for manufacturing a disk drive with reduced acoustic noise as recited in claim 6, wherein the damping medium comprises a metal weight.

* * * * *